(12) United States Patent
Gurlahosur

(10) Patent No.: US 10,312,703 B2
(45) Date of Patent: *Jun. 4, 2019

(54) BATTERY CHARGING SYSTEM WITH POWER PATH SWITCH CONTROL

(71) Applicant: National Semiconductor Corporation, Santa Clara, CA (US)

(72) Inventor: Sanjay Gurlahosur, Gourock (GB)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/930,519

(22) Filed: Nov. 2, 2015

(65) Prior Publication Data

US 2016/0118822 A1 Apr. 28, 2016

Related U.S. Application Data

(63) Continuation of application No. 13/211,987, filed on Aug. 17, 2011, now Pat. No. 9,178,407.

(51) Int. Cl.
*H02J 7/06* (2006.01)
*H02J 7/00* (2006.01)
*H02J 7/04* (2006.01)
*H02J 7/08* (2006.01)
*H02M 1/08* (2006.01)

(52) U.S. Cl.
CPC .......... *H02J 7/0031* (2013.01); *H02J 7/007* (2013.01); *H02J 7/045* (2013.01); *H02J 7/085* (2013.01); *H02M 1/08* (2013.01)

(58) Field of Classification Search
CPC .......... H02J 7/007; H02J 7/008; H02J 7/042
USPC ................... 320/107, 134, 163, 164
See application file for complete search history.

(56) References Cited

U.S. PATENT DOCUMENTS 6,184,660 B1 * 2/2001 Hatular .............. H02J 7/022
320/139
9,178,407 B2 * 11/2015 Gurlahosur .......... H02J 7/045

* cited by examiner

*Primary Examiner* — Edward Tso
*Assistant Examiner* — Aaron Piggush
(74) *Attorney, Agent, or Firm* — Tuenlap Chan; Charles A. Brill; Frank D. Cimino

(57) ABSTRACT

A battery charger circuit having a regulator controller configured to control the switching transistors of a switching voltage regulator. A power path switch is disposed intermediate an output of the switching voltage regulator and a terminal of a battery to be charged, with the power path switch including at least two transistor segments having common respective drain electrodes, common respective source electrodes and separate respective gate electrodes. A power path switch controller operates to sequentially turn ON the at least two transistor segments of the power path switch, preferably in the order of a decreasing ON resistance.

12 Claims, 9 Drawing Sheets

BATTERY CHARGING SYSTEM WITH POWER PATH SWITCH CONTROL

BACKGROUND OF THE INVENTION

1. Field of the Invention

The present invention relates generally to battery charger circuitry and in particular to circuitry which includes a power path switch and associated control circuitry.

2. Description of Related Art

Referring to the drawings, FIG. 1 is a simplified circuit diagram of a prior art battery charger 10. The charger is powered by a DC-DC switching voltage regulator which converts a DC input $V_{BUS}$ from an external power source to a DC output voltage $V_{DD}$ present on a system bus. In the present example, the regulator is a buck regulator which steps the input voltage down to a smaller output voltage. The regulator controller 12 includes a pair of switching transistors including a high side P type transistor 14 connected between the input $V_{BUS}$ and an inductor 18. A low side N type transistor is connected between the inductor 18 and circuit common. An output capacitor 20 in combination with inductor 18 function as regulator output filter. A fraction of the regulator output voltage $V_{DD}$ is sensed by a voltage divider made up of resistors 22A and 22B, with the divider output being fed back to one input of an error amplifier 24 of the controller. The second input to error amplifier 24 is either a reference voltage Vref, which is a fixed voltage of typically 1.2 V, and a variable voltage Vtrack to be described. The two voltages are selected by a multiplexer circuit 31.

As is well known, the controller 12 uses anti-phase drive to control the state of switching transistors 14 and 16, with the switching duty cycle being controlled to provide the regulated output voltage VDD where the sensed fraction of the output voltage is equal to reference voltage Vref which may be 1.2 voltage, by way of example. Assuming in this example that the charger is configured to charge single cell Li ion batteries, $V_{DD}$ is typically regulated to be about +4.4 volts once any battery connected to the charger has been fully charged. Charging accuracy is important for Li ion batteries since charging to a voltage of only 1% in excess of the specified voltage and charging to less than 1% of the specified voltage is undesirable.

The regulated output $V_{DD}$ is connected to a battery 30 to be charged by way of what can be referred to as a power path switch (PPS) 26. As will be described, switch 26 provides both a power path function and a regulator function, with control of these functions being carried out by a control circuit 34. In addition to providing a charging source for battery 30, output $V_{DD}$ operates to power the system, otherwise powered by the battery, when the battery is in a discharge state. As will be explained, the value of VDD varies from $VDD_{MIN}$ of +3 volts to a final value of +4.4 volts.

FIG. 2 is a timing diagram depicting a typical battery charging sequence. At time t1, battery 30 is in a deep discharge state having a voltage VBAT significantly less than 3.0 volts, that being the minimum system voltage $VDD_{MIN}$. Initially, near time t1, transistor 26 is controlled to operate as a current regulator providing a relatively small fixed charging current. (Circuitry for sensing the charging current is not depicted.) Meanwhile, the system connected to the $V_{DD}$ bus is being powered by the switching voltage regulator at voltage $VDD_{MIN}$. This is sometimes called the pre-charge mode. It should be noted that in the event external power source VBUS is not present when the battery is in the pre-charge mode, switch 26 it turned off to isolate battery 30. Battery 30 is also isolated when the charger is not in the pre-charge mode. By way of example, if VBUS is not present and there is no startup event such as detection of an activation of a power on switch or some kind of an alarm event, battery 30 is isolated to save power. Should the external power be applied at this time, switch 26 should be maintained off until VDD becomes greater than VBAT to avoid discharging the battery. Prior to time t1, when VDD is still smaller than $VDD_{MIN}$, multiplexer 31 will select the fixed reference voltage Vref to be applied to error amplifier 24.

Eventually at about time t2, the small charging current will cause battery 30 to be charged up to the point that VBAT is around $VDD_{MIN}$ of +3.0 volts. At the point, multiplexer 31 will select Vtrack for regulating the value of VDD. In addition, transistor 26 is controlled by block 34 to operate as a linear voltage regulator where conductivity of the transistor is adjusted so as to maintain a constant voltage drop across the transistor and regulate a constant charge current into battery 30. Voltage Vtrack is derived from VBAT using a resistive divider made up of resistors 28A, 28B and 28C. A further voltage Vref', also derived from VBAT, is used for the linear regulator control of transistor 26. The values of resistors 28A, 28B and 28C are selected to produce voltages Vtrack and Vref' having a magnitude such that voltage across transistor 26 is maintained at 200 mV thereby fixing the voltage difference between VBAT and VDD at that value.

During this period, a relatively high constant current flows through transistor 26 to charge battery 30. Circuitry is typically provided to limit the maximum current charging level and to limit the battery temperature. At about time t3, the battery voltage has reached a final value of +4.2.

The time from t2 to t3 is typically referred to as the constant current portion of the charge cycle. During this period, as the battery voltage VBAT increases, the value of Vtrack also increases thereby increasing VDD so that the voltage across transistor remains at 200 mV. Note that transistor 26 is typically a large device having a $R_{ON}$ value, when fully turned ON, of only 50 mΩ. However, when operating as a linear regulator, the ON resistance of transistor 26 is controlled to maintain the 200 mV. Once again, during this period the system connected to the VDD bus is powered by the switching voltage regulator.

At the end of the constant current portion of the charge cycle at T3, constant voltage portion of the charge cycle is entered. During this time, the voltage VBAT is regulated to specific voltage of +4.2 volts specified in this case by the battery manufacturer. In this constant voltage portion of the charging cycle the charging current will drop off fairly rapidly until the battery 30 is fully charged at some time soon after t4. At this point the charging current will drop to near zero. However, in order to provide head room for the operation of the linear regulator, the drain-source voltage of transistor 26 must be maintained above some minimum value, such as 200 mV in this example, to ensure that VBAT is held at the specified target voltage. Thus, even after the charging current has dropped to near zero, VDD must be greater than VBAT to provide a sufficient voltage difference for the operation of the linear regulator. The charging sequence is terminated when the charging current is reduced to 10% of the full value, with the power path switch 26 being turned OFF at this point so as to isolate battery 30.

When the external power source VBUS is present, the system power on VDD is provided by the DC-DC regulator as is the power for maintaining a charge on the battery.

Transistor switch 26 effectively isolates battery 30 from the system load on bus VDD. When the external power is removed, transistor 26 is automatically turned fully ON so that the system is powered by battery 30 through the transistor.

The charger architecture of FIG. 1 provides a means for powering a system either from an external DC source or a battery. Further, the system can be powered even if the battery is deeply discharged. However, certain improvements can be made to improve efficiency and reliable operation, particularly with respect to the implementation and control of power path switch 26. As will become apparent to those skilled in the art upon a reading of the following Detailed Description of the Invention together with drawings, one or more embodiments of the present invention provide significant improvements over the FIG. 1 approach.

DETAILED DESCRIPTION OF THE INVENTION

Figure 3:
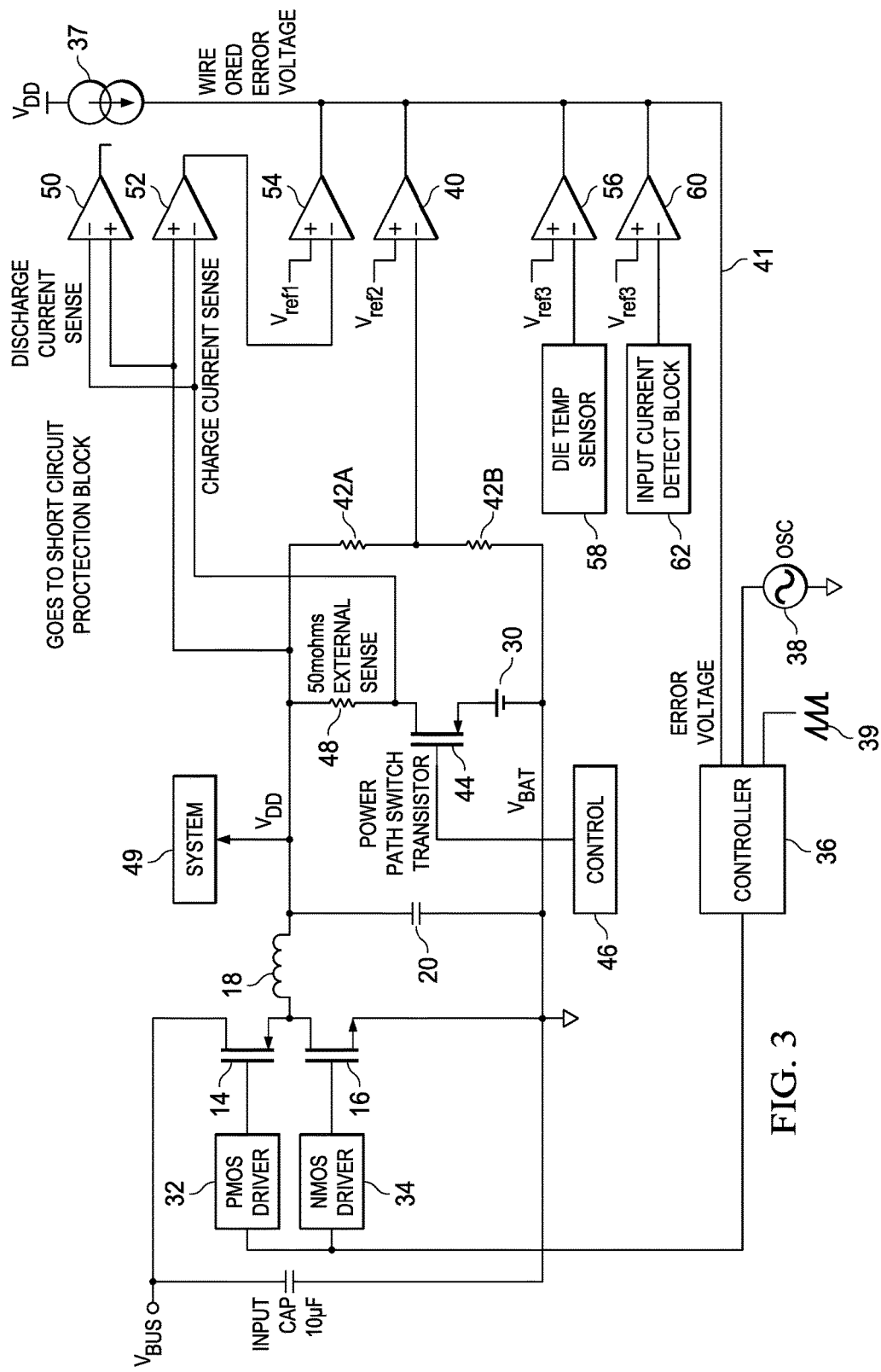
FIG. 3 is a circuit diagram of a battery charger in accordance with one embodiment of the present invention.

Referring again to the drawings, FIG. 3 shows one embodiment of the present invention. The battery charger includes a buck switching regulator which includes a high side P type transistor 14 and low side N type transistor 16, having a common node connected to one side of inductor 18. An external power source provides an input voltage VBUS to the switching regulator at the source of transistor 14. A controller 30 is provided for driving a P MOS driver 32 and an N MOS drive 34. Controller 30 operates to provide a switching signal to the drivers 32 and 34 in response to an error voltage applied to one of the inputs of the controller 36. The other inputs to controller 36 include a clock signal from clock source 38 and a saw tooth signal 39 used by pulse width modulation circuitry located in controller 36 to provide voltage regulation by changing the duty cycle of the transistor switches 14 and 16.

The other end of inductor 18 is connected to a filter capacitor 20 and to an output voltage node that provides output voltage VDD. Voltage VDD functions both as a battery charging source and a power source for a system bus, with the system bus being powered by the battery except when the battery is in a discharged state or absent.

The error voltage on line 41 coupled to controller 36 is applied to one input of a comparator (not depicted) within the controller, with the other input being the saw tooth signal 39 so as provide the pulse width modulation function. Various different error amplifiers are used to generate the error voltage. Each error amplifier includes a source-follower output stage which includes a P type transistor (not depicted) having a drain electrode connected to ground and an open source electrode output connected to common line 41. A current source 37 is connected between line 41 and supply voltage VDD. Although each error amplifier remains active during the various modes of charger operation, only the error amplifier with the lowest value error voltage actually controls the magnitude of the error voltage on line 41 and thus controls the loop. In other words, the error amplifier with smallest error voltage overrides the outputs of the other error amplifiers having higher error voltages. This is an analog analogy to a digital wired OR circuit.

Amplifier 40 is one potential source of the error voltage on line 41. Error amplifier 40 compares a fixed fraction of voltage VDD to a reference voltage Vref2. That fixed fraction is determined by a resistive voltage divider made up of resistors 42A and 42B. Assuming that the error voltage output of an error amplifier 40 is the lowest level voltage on line 41, error amplifier 40 operates in the conventional manner to alter the duty cycle of the transistor switches 14 and 16 so as to provide a regulated output voltage VDD. This error voltage source is active, by way of example, when the battery is absent or not charged and the external supply VBUS is present so that voltage VDD is at a nominal value of +4.2 volts. During the constant voltage portion of a battery charging cycle, error amplifier 40 also operates to maintain VDD at +4.2V.

At other times during the charger operation, the switching regulator is also controlled to provide a constant current output. This is done by controlling the regulator so that a constant voltage is maintained across a current sensing resistor as will be explained. Under these conditions, the output of error amplifier 40 for regulating VDD at a fixed voltage is effectively overridden by another error amplifier output (a lower level output), with voltage VDD changing as required to provide the desired constant current output of a specific magnitude.

In accordance with once aspect of the present invention, a power path switch transistor 44 is provided which provides various functions, including the isolation of battery 30 from the system load represented by block 49 when the external power source that provides voltage VBUS is present. Thus, power is provided to the system load 49 from the external source VBUS rather than the battery 30 so as to reduce the number of charge/discharge cycles for the battery thereby extending the battery life. Block 46 represents the circuitry for controlling switch 44 as will be described. When the power path switch is fully ON, the resistance for the present exemplary embodiment is 50 mΩ.

A current sense resistor 48 is provided to permit the monitoring of the battery charge and discharge current. Resistor 48 is typically a discrete resistor having a resistance of 50 mΩ and is capable of dissipating ¼ of ½ watts. When battery 30 is being discharged, a differential amplifier 50 provides an output error voltage indicative of the magnitude of the discharge current. When the battery 30 is being charged, another differential amplifier 52 provides a voltage indicative of the charge current magnitude. The output of the charge current amplifier 52 is coupled to the input of an error amplifier 54 which compares the charge current magnitude with a reference voltage Vref1, with Vref1 being indicative of a charge current magnitude. An error output voltage is produced which is provided to controller 36 so that a constant charging current can be produced having a magnitude set by the value of Vref1. Note that current sense resistor 48 could be eliminated by using the power path switch transistor 44 as a current sensing element. Each of these current related error amplifiers are operative only when the respective error voltage produced by the error amplifier is the lowest voltage in line 41. Thus, when a charge current is close to a target level set by Vref1, the resultant small error voltage out of amplifier 54 commence control of the loop, perhaps replacing error amplifier 40 which provides voltage regulation for output VDD. Thus, the controller 36 will operate to adjust the regulator voltage VDD to whatever is needed to produce a voltage across sense resistor 48 that corresponds to the value set by Vref1.

A further error amplifier 56 compares the output of a die temperature sensor (not depicted) which is formed in the same integrated circuit in which the subject battery charger circuit is implemented. A voltage Vref3 is provided which is indicative of maximum die temperature so that the charging of the battery is controlled so that this maximum die temperature value is not exceeded for higher charge currents. Battery 30 temperature is sensed separately using the battery thermistor and the charge current is changed so that the maximum battery working temperature is not exceeded. This is carried out digitally using an ADC for sensing the analog thermistor output. An input current detector block 62 monitors the current provided by the external power source VBUS. This current is compared by an error amplifier 60 with a reference voltage Vref4 indicative of a predetermined input current value. The output of the error amplifier 60 is used to terminate or limit the battery charging current in the event the external input current from VBUS is exceeded. This feature is needed for USB inputs which have maximum output current limitations. Other types of external power sources may have differing output current limitations.

Figure 4:
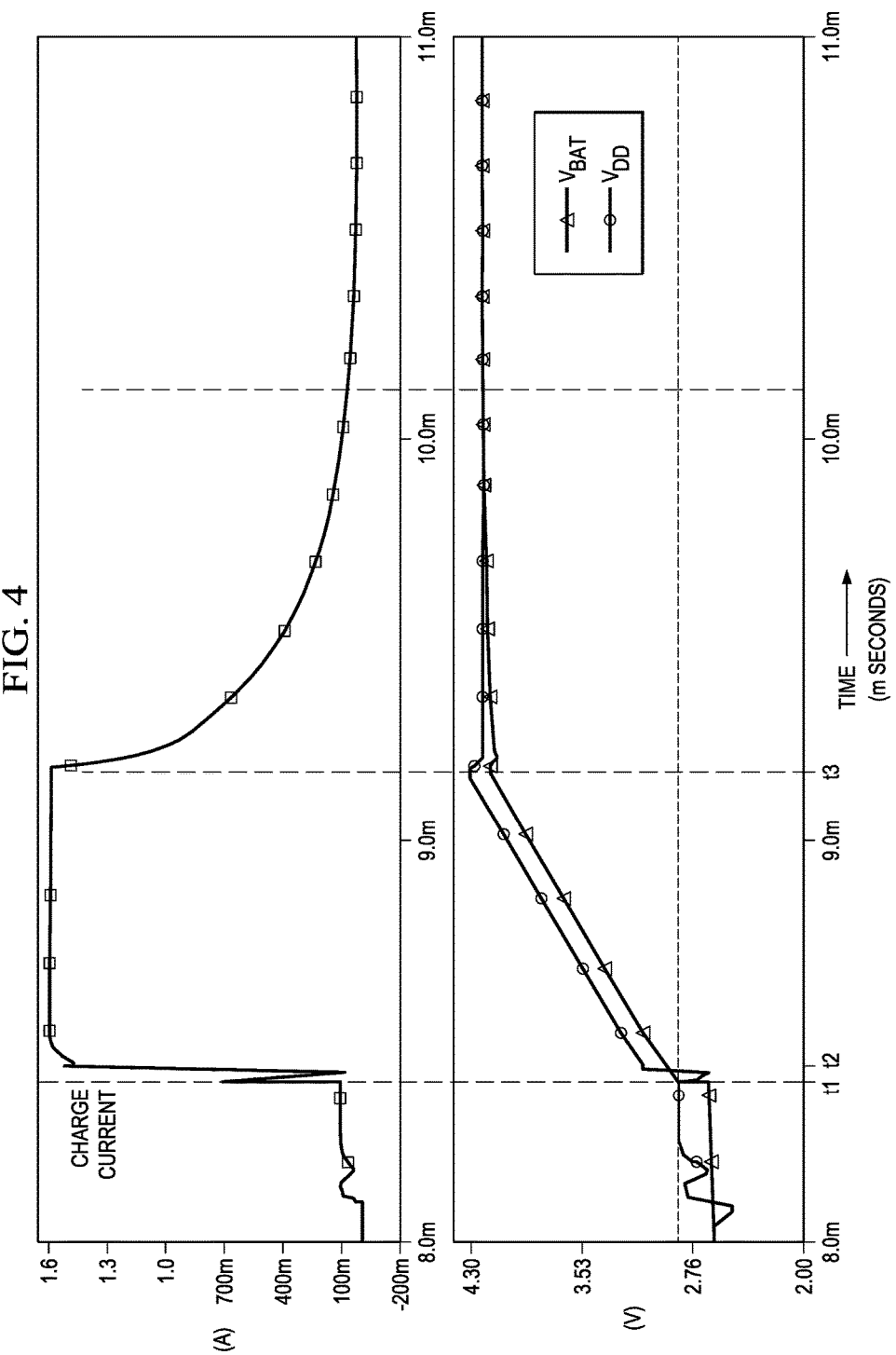
FIG. 4 is a timing diagram of a battery charging sequence further illustrating operation of the battery charger of FIG. 3.

Operation of the FIG. 3 charger will now be explained using the diagram of FIG. 4, assuming that battery 30 is a single cell Lithium Ion (Li+). The absolute values of the time scale of FIG. 4 are not intended to be accurate with only the relative time values being pertinent. At the beginning of the time scale, the regulated output voltage VDD is below a specified value of about 2.6 volts in the present example, with VBAT being slightly lower at this time (VBAT=2.6 V, VDD=2.59 V). During this initial period, control 46 keeps the power path switch 44 OFF until voltage VDD exceeds VBAT to prevent a reverse current flow from battery 30. Once VDD is higher than VBAT, the power path switch is turned ON. Note that the details for implementing a preferred embodiment of the power path switch 44 and controlling the switch by way of control block 46 will be subsequently described in detail.

Once the power path switch 44 is turned ON at time t1 and assuming that battery 30 is discharged, the charger circuit is in a pre-charge mode where the charge current is set to around, by way of example, to 100 mA. The current level is controlled using sense resistor 48 and error amplifier 54. Further details regarding a preferred pre-charge mode of operation will be described later. At time t2 the pre-charge mode of operation ends when VBAT reaches a threshold voltage of 2.64 V. A constant current charge mode is then entered where the voltage being regulated across sense resistor 48 is increased to a value corresponding to about 1.6 A. During this heavy charging period, the battery voltage VBAT increases as the battery is charged. Voltage VDD is equal to VBAT plus the voltage drop across the 50 mΩ current sense resistor 48 and the 50 mΩ power path switch 44 which totals 160 mV (100 mΩ×1.6 A). During the constant current modes of operation, the regulator adjusts the value of VDD to maintain a voltage across the sense resistor 48 using error amplifiers 52 and 54 that corresponds to the magnitude of the desired constant current. Thus, since the error voltage produced by current sense error amplifier 54 is smaller than the error voltage produced by voltage sense amplifier 40, the current sense error amplifier 54 controls the feedback loop and not amplifier 40.

As the battery voltage VBAT increases, so does voltage VDD. The charge current is reduced as the voltage drop across sense resistor 48 drops. Eventually, VDD will approach 4.2V which is the charge termination voltage for the battery 30, where the charger exits the constant current mode and enters the constant voltage mode. At this point, the feedback loop stops being controlled by error amplifier 54, with amplifier 40 starting to dominate the loop.

The constant voltage mode is entered at about time t3 where VDD is at +4.2 volts. The charge current level (10% of full charge level) produces a voltage drop across power path transistor 26 and current sense resistor of only 10 mV (100 mΩ×0.1 A=10 mV). Thus, VBAT is 10 mV less than VDD or +4.19V, with that voltage being within the specified charge termination voltage tolerance for a nominal termination voltage of +4.20V. At the point in time when the charge termination voltage is finally reached, VBAT and VDD differ by a negligible voltage, preferably less than 20 mV or even smaller.

Figure 1:
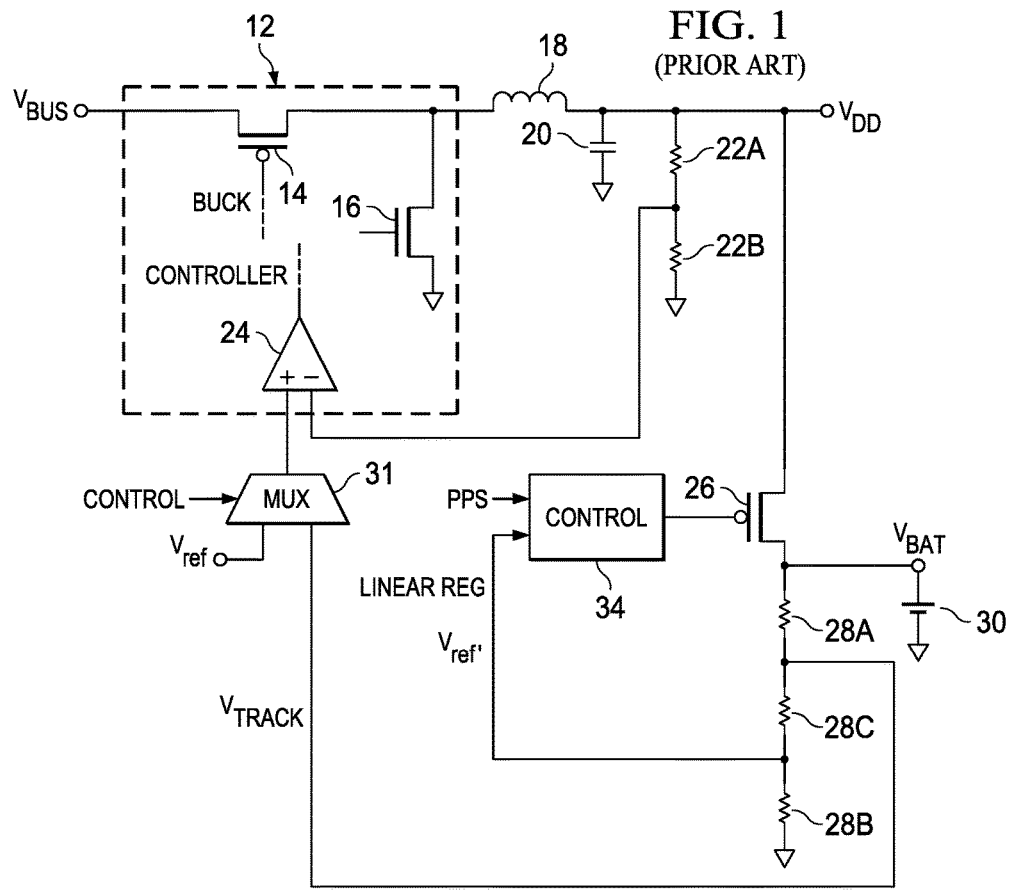
FIG. 1 is a simplified circuit diagram of a prior art battery charger utilizing a DC-DC switching converter.
Figure 2:
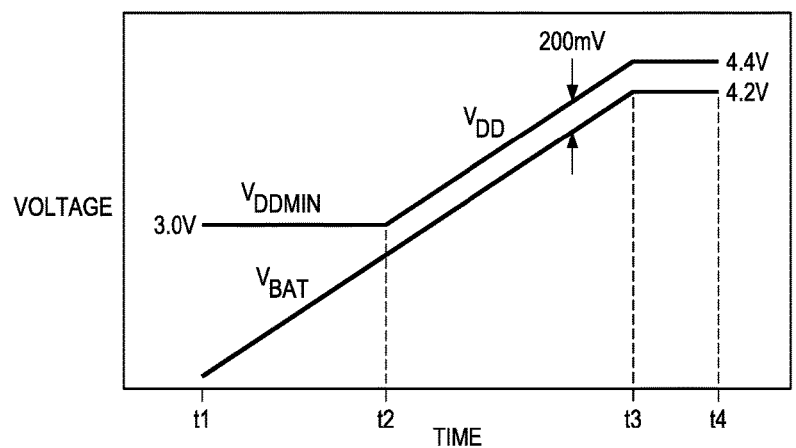
FIG. 2 is a timing diagram of a battery charging sequence further illustrating operation of the FIG. 1 battery charger.

It can be seen from the foregoing that the magnitude of the system voltage VDD can be set exactly to the final charge voltage or termination voltage for the Li+ battery 30 which is typically close +4.2 volts. Unlike the prior art approach of FIGS. 1 and 2, it is not necessary to provide a system voltage VDD significantly higher than final charge voltage in order to ensure sufficient head room to accommodate the voltage drop across transistor 26 during linear regulator operation and to take into account a voltage drop across any current sense resistor that may be used. That excess voltage may be on the order of 200 to 300 mV so that the charger is required to provide a system voltage larger than otherwise needed for not only charging the battery but for powering system 49 (FIG. 3) when the battery is not present or when the battery is charged but external power VBUS is available. This excess system voltage needlessly wastes power, particularly given that the power consumed is related to the square of the supply voltage.

Figure 5:
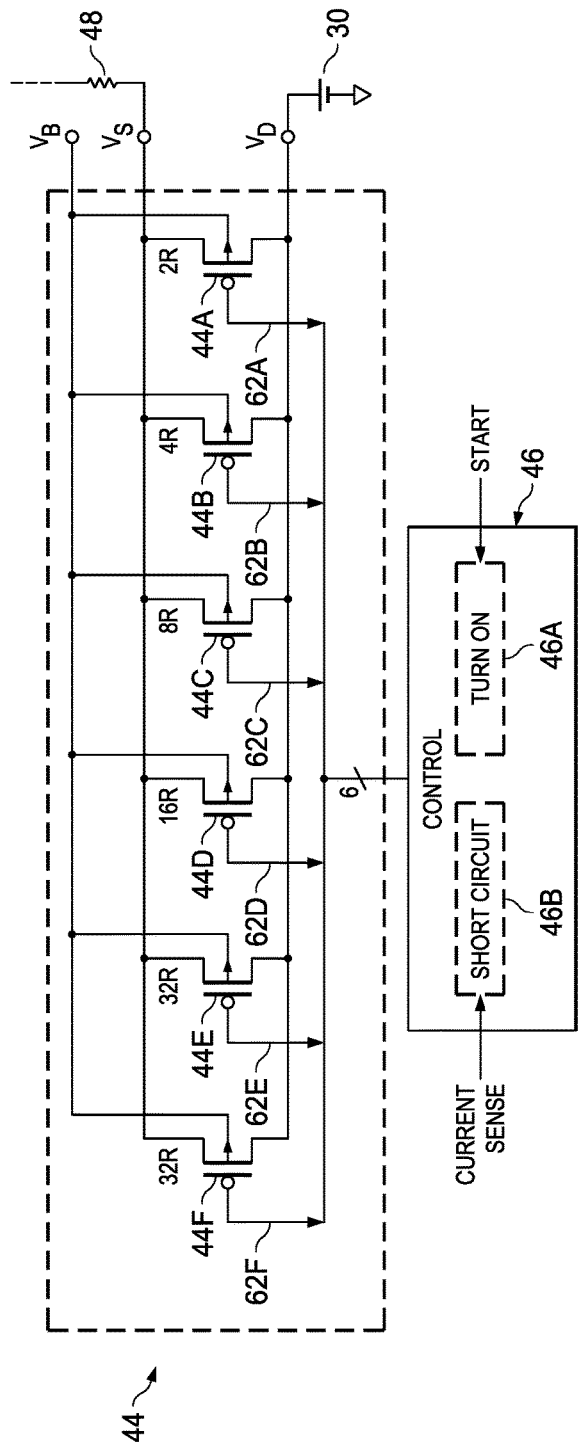
FIG. 5 is a schematic diagram of a power patch switch and related control system for use in the FIG. 3 battery charger.

For reasons to be described, it is preferable that the power path switch 44 be implemented in multiple segments. FIG. 5 shows one exemplary embodiment of switch 44 which includes six separately controllable P type transistor segments 44A-44F having the respective source terminals connected in common to line Vs and having the respective drain terminals connected in common to line VD. The body regions of each segment are connected to a common line VB which is connected to the most positive voltage of VBAT or VDD. The six separate gate electrodes which carry respective gate control signals 62A to 62F are separately connected to control block 46.

The largest transistor segment and hence the smallest ON resistance is segment 44A which has an ON resistance of 2R, with R being 50 mΩ. The remaining transistor segments 44B to 44F have respective ON resistances of 4R, 8R, 16R, 32R and 32R. When all six segments are ON, the parallel combination provides an ON resistance of R, that is, 50 mΩ. Since transistor 44 will have to conduct currents on the order of 2 A, the respective source and drain metallization must be implemented to conduct these relatively high currents.

As previously described, as a discharged battery enters the pre-charge mode, the charge current is limited to around 50 to 150 mA. Once the pre-charge mode threshold is exceeded, the constant charge current mode can be entered where the maximum current can be 2 A. When in the pre-charge mode at a time where the battery charger happens not to be powered (VBUS not present), then VDD will be lower than the battery voltage VBAT as the power path switch is turned OFF to isolate battery 30 to avoid any leakage currents. If power to the charger is then applied (VBUS is present), there will still be a tendency for the battery to discharge into the VDD terminal so the power path switch 44 is held OFF until VDD has had a chance to increase to a value greater than VBAT. However, if the power path switch 44 transitions from a fully OFF to a fully ON state under these conditions too quickly, a large overshoot in inductor 18 current will result since the current regulation loop will not have had sufficient time to settle. This results in a large and undesirable overshoot in the charge current. On the other hand, if too much time is required to turn ON the power path switch 44, voltage VDD will have had time to become substantially larger than VBAT. In that case, there will also be a large overshoot in inductor current when the power path switch if turned ON. Again, this results in a large and undesirable overshoot in the charge current when the switch is turned ON.

Figure 6:
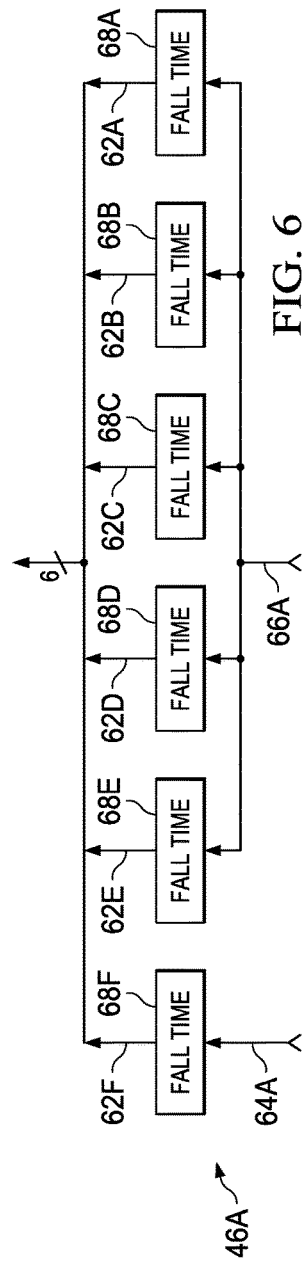
FIG. 6 is a schematic diagram of the control circuit for the FIG. 5 power path switch for providing a soft start.
Figure 8:
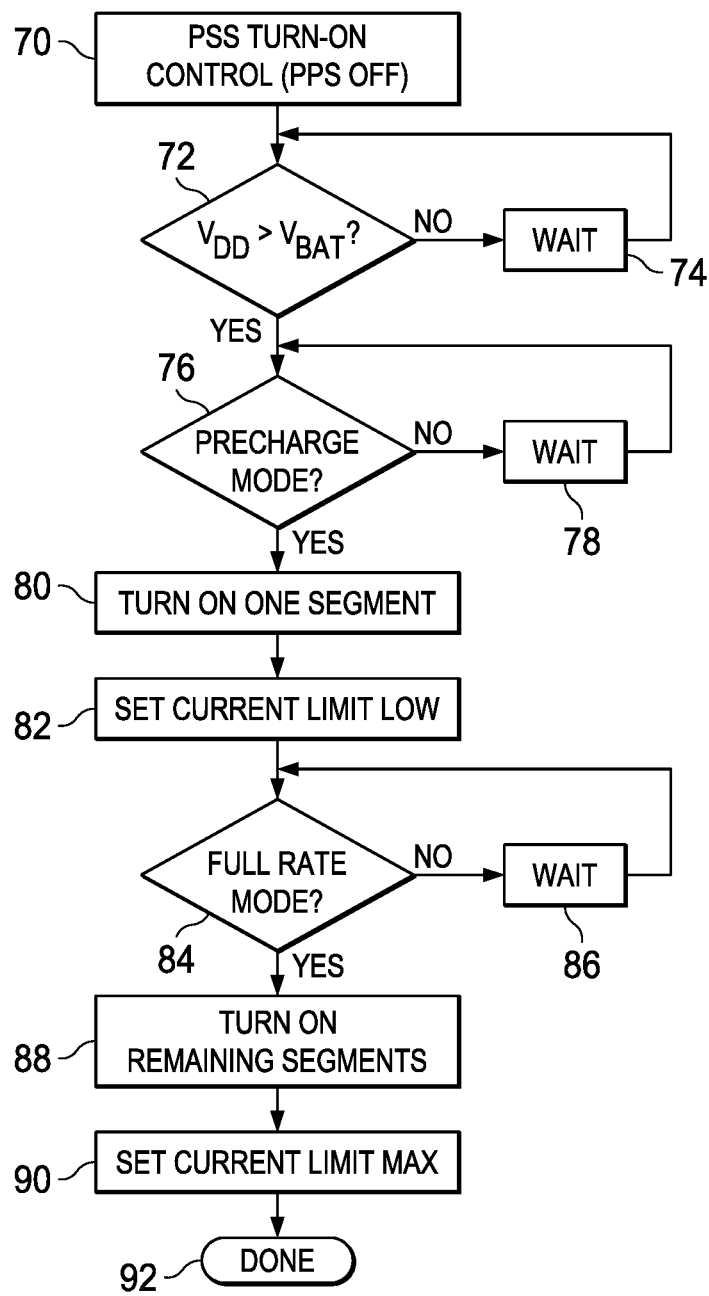
FIG. 8 is a flow chart illustrating the soft start sequence provided by the power path switch.

In order to minimize such current overshoot, the transistor segments 44A to 44F of the power path switch 44 are turned ON in a controlled manner starting at the pre-charge stage. FIG. 6 shows a simplified diagram of a control circuit 46A, which is part of control 46 (FIG. 5) for carrying out a turn-on sequence for switch 44. FIG. 8 is flow chart showing the turn-on sequence. Control circuit 46A produces six gate control signals 62A-62F which are sequentially generated for sequentially turning on each of the six transistor segments 44A-44F of the power path switch 44. Since the transistor segments are P type, the gate controls signals transition from a high state of about +4.2 V to ground level to turn the segments ON.

Referring to the FIG. 8 flow chart, as indicated by block 70, the power path switch 44 is initially OFF. Thus, for example, if VBUS is not present or if no start up event occurred, the battery is isolated from VDD. Such start up events include activation of a power on key, an alarm event or momentary power loss which occurs, by way of example, when a cell phone utilizing the charger is dropped. As can be seen in FIG. 7C, soon after power VBUS (FIG. 3) is applied to the charger, a status signal 64 changes state (64A) at time t1 indicating that voltage VDD has increased to a level larger than the battery voltage VBAT. This is indicated by block 72 of the FIG. 8. The power path switch can then proceed to be turned ON without concern that the battery 30 will discharge into the VDD bus. Thus, at time t1, control 46A generates a gate control signal 62F for the 32R transistor segment 44F. The negative going control signal has a relatively short fall time set by fall time control circuit 68F. The gate control signal 62F will turn ON segment 44F so that the initial ON resistance of the power path transistor will be 32×50 mΩ or 1.6Ω (elements 76, 78 and 80 of the FIG. 8 flow chart). During this pre-charge period, the charging current is limited to about 100 mA (block 82 of the FIG. 8 flow chart). Note that circuit 68F controls the fall time of signal 62F so that the 32R segment 44F takes about 50 μs to turn ON.

At time t2, a further status signal 66 (FIG. 7B) changes state indicating that the charger is going into the constant current charging mode. At this point the remainder of the power path switch is to commence being turned ON. When signal 66 transitions (66A), all of the five remaining gate control signals 62A to 62E begin to change states. This is indicated by elements 84, 86 and 88 of the FIG. 8 flow chart. As each of the five remaining transistor segments is turned ON, the resistance of the power path switch 44 is reduced by half from 1.6Ω to 0.8Ω, then to 0.4Ω, then to 0.2Ω, then to 0.01Ω and finally to 0.05Ω. Table 1 below shows a set of exemplary fall time constants (time for signal to drop to about 37% of the initial value) provided by fall time circuits 68A-68F of FIG. 6.

TABLE 1

| Fall Time Circuit (FIG. 6) | Time Constant (Approximate) (μ sec) |
| --- | --- |
| 68A (2R) | 800 |
| 68B (4R) | 400 |
| 68C (8R) | 200 |
| 68D (16R) | 100 |
| 68E (32R) | 50 |
| 68F (32R) | 50 |

At about time t3, which is about 8.55 msecs after the start of the pre-charge mode starting at time t1, the charger circuit switches to the constant current mode with a full current limit at 3 A (block 90 of the FIG. 8 flow chart). In the conventional manner, once the battery has reached the target charge voltage, the constant current charge period is ended and the constant voltage charge period commences. Note that the previously described sequence involving a soft turn ON of the power path switch 44 substantially reduces the inductor current overshoot. Note that since the charge current in the pre-charge mode is only 100 mA, the ON resistance of the power path switch 44 is set higher which results in a larger voltage between VDD and VBAT which is acceptable in this mode. Also, during the pre-charge mode, the peak current limit for the charger is reduced to 40% of the normal 3 A.

Figure 7A:
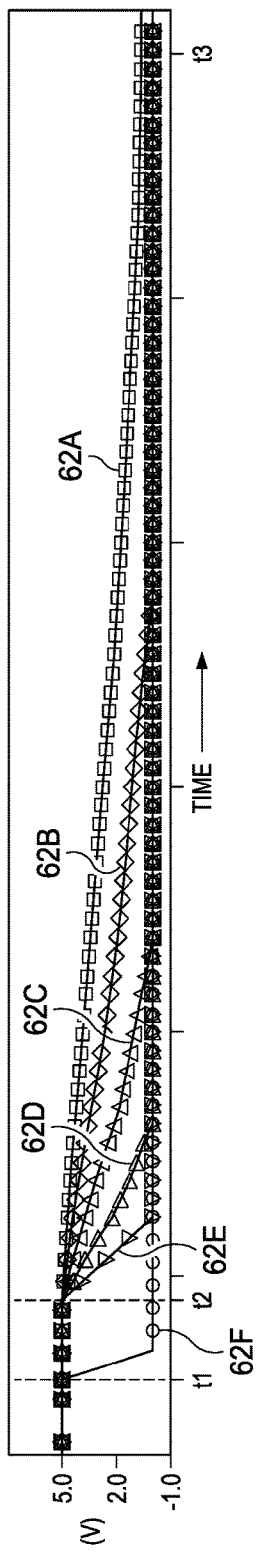
FIGS. 7A to 7C are timing diagrams illustrating the manner in which the various segments of the power path switch are turned ON during a soft start sequence.
Figure 7B:
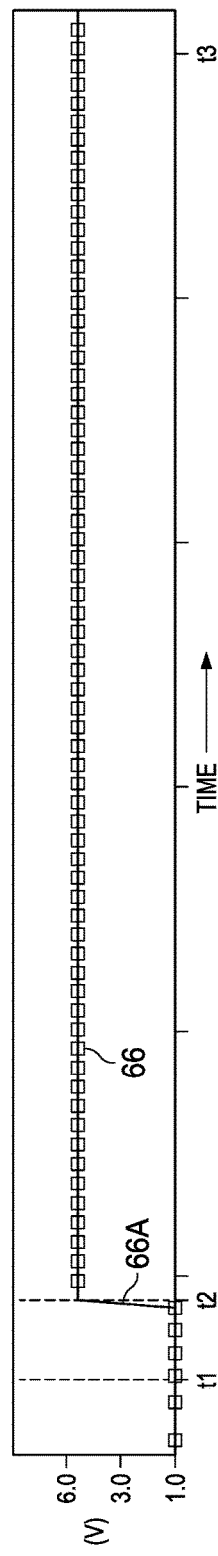
Figure 7C:
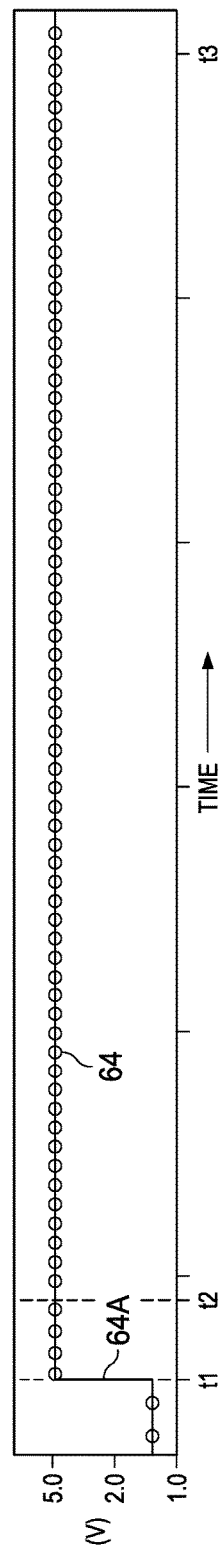

It can be seen from the FIG. 7A timing diagram that the six transistor segments of the power path switch 44 are sequentially turned ON. First, only one of the 32R segment 44F is turned ON as indicated by the transition in gate signal 62F at time t1. After segment 44F is turned fully ON in the present exemplary embodiment, the remaining fives segments 62A-62E start to be turned ON at time t2. However, due to the differences in the fall times of the five gate control signals 62A-62E, the five segments are effectively turned ON at differing times. Thus, the six segments are considered to be sequentially turned ON. The total time for transitioning from a fully OFF state to a fully ON state is preferably on the order of msecs and is at least 1 msec.

The segmented power path switch 44, in accordance with a further aspect of the present invention, can also be used to provide protection in the event of a short circuit condition at the VDD output. This approach is used when the switching regulator is off so that all power provided to the VDD output and associated load originates from battery 30. As previously described, external current sense resistor 48 is used to monitor the battery charging current and the battery discharge current. Error amplifier 50 provides an output voltage proportional to a magnitude of the discharge current and is also proportional a current drawn form battery 30 through the power path switch 44 and current sense resistor 48 through a short between VDD and ground. Under typical normal operating conditions, the maximum current flow through the power path switch 44 and the external current sense resistor 48 is 2 A. That means maximum expected power dissipation for the 50 mΩ current sense resistor is 200 mW so that a ¼ or ½ watt resistor is used. However, should a short circuit condition having a resistance of 0.1Ω formed between the VDD output and ground, the short circuit current can be on the order of several amperes. By way of example, assuming a short circuit resistance of 0.1Ω, a, current sense resistor 48 of 0.050Ω, a power path switch 48 resistance of 0.050Ω and a battery VBAT of 4.2V, the resultant short circuit current is 21 A (4.2V/0.20Ω). This current would be further limited to 10.5 A, by way of example, if battery 30 has an equivalent series resistance (ESR) of 0.200Ω. This current is provided by battery 30 by way of the power path switch 44 and sense resistor 48. This high level current and the resultant power dissipation will damage both switch 44 and resistor 48 if it persists for any significant period of time, such as around 100 μsec by way of example. As will be described, the present protection circuitry is capable of addressing short circuit conditions in much less than 100 μsec. As will be apparent from the following description, a further advantage of this approach is that transients and similar events that do not rise to the level of a short circuit will not cause the power path switch to 44 to become fully turned OFF so as to needlessly interrupt power to the system connected to source VDD.

Figure 9:
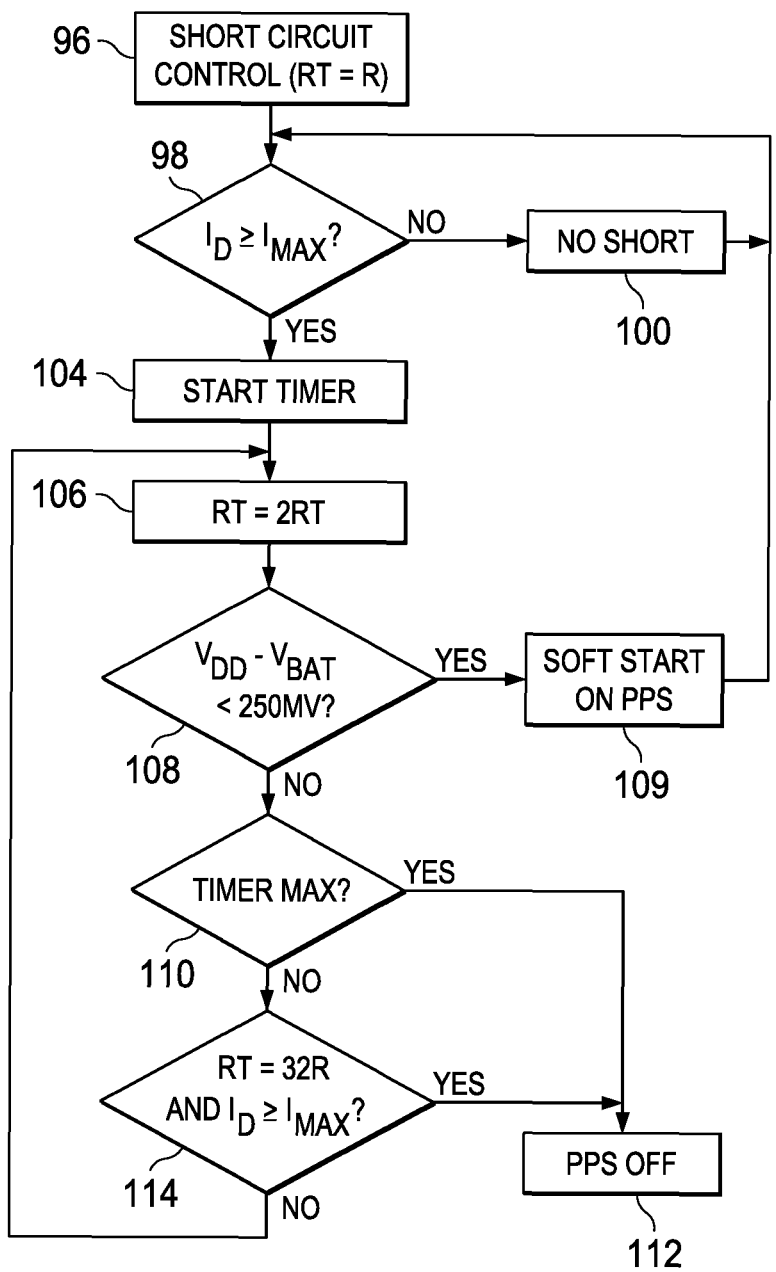
FIG. 9 is a flow chart illustrating a power path switch turn-off sequence in the presence of a short circuit condition.
Figure 10:
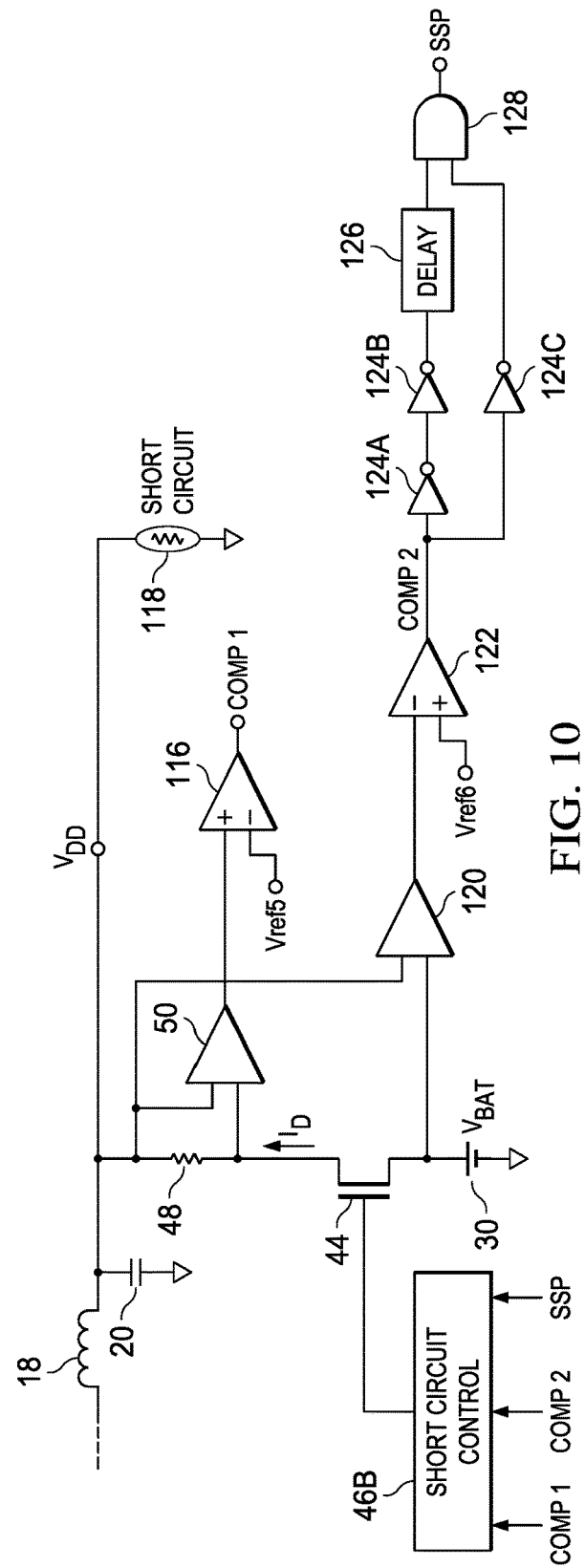
FIG. 10 is a simplified schematic diagram of the circuitry associated with controlling the power path switch in the presence of short circuit conditions.

In order to prevent permanent damage caused by short circuit currents, control circuitry 46B (FIG. 5) is provided which operates to sense the presence of a short circuit condition and, in response, to switch the power path switch 44 OFF in a controlled manner. The sequence is illustrated in the flow chart of FIG. 9, the circuit diagram of FIG. 10 and the timing diagram of FIG. 11 (not shown to scale). The FIG. 10 circuit diagram shows some of the additional circuitry for use in carrying out the short circuit protection function. Symbol 118 represents an actual or potential short circuit condition existing between output VDD and the circuit common. As previously described, current sense resistor 48 along with error amplifier 50 provide an output voltage indicative of the charging and discharging current. One output of the error amplifier 50 is connected to an input of a comparator 116 to provide a Comp 1 output which is used to provide an indication of a short circuit condition located between output VDD and ground as represented by symbol 18. Another error amplifier 120 senses the voltage between VDD and VBAT and provides that difference voltage to the one input of a second comparator 122. The second input of comparator 122 is connected to Vref5, which is set to 250 mV in the present example. The output Comp 2 of comparator 122 functions to determine the status of a short circuit condition after that condition has been detected by comparator 116. As will be described, logic circuitry following comparator 122 is used to initiate a soft start of the power path switch 44 after all or part of the switch has been shut off during a short circuit event. That logic circuitry includes inverters 124A, 124B and 124C along with delay circuit 126 and an AND gate 128. When Comp 2 initially goes low, one input to gate 128 is high due to inverter 124C, with the other input being low until the end of the delay period produced by circuit 126 at which time the delay output goes high momentarily thereby causing gate 128 to produce a pulse.

As indicated by block 96 of the flow chart, the power path switch 44 is initially fully ON so that the present resistance RT of switch 44 is equal to R or 50 mΩ where all six segments 44A to 44F are turned ON. The discharge current ID through sense resistor 48 flowing to the VDD terminal is measured as indicated by element 98. This is accomplished by monitoring the voltage across resistor 48 using error amplifier 50. The maximum discharge current Imax from battery 30 is set to 2.5 A as is determined by reference voltage Vref5 at one input of comparator 116. If the threshold current Imax is not exceeded, as indicated by elements 98 and 100 of FIG. 9, there is no short circuit condition.

Figure 11:
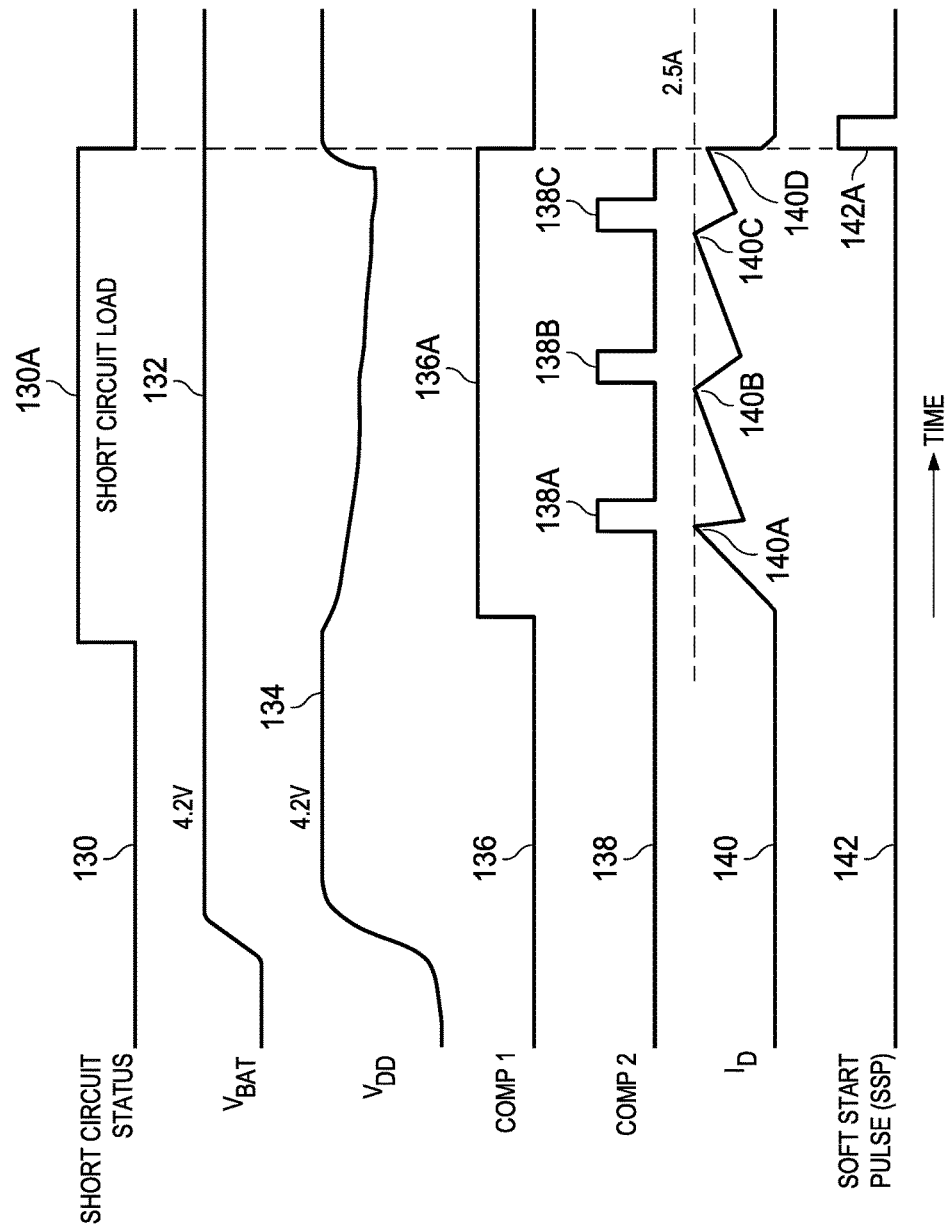
FIG. 11 is a timing diagram further illustrating operation before and during short circuit conditions.

The discharge current ID is tested continuously, with the sequence remaining in this loop until a short circuit condition is detected. Waveform 130 of FIG. 11 illustrates the commencement of a potential short circuit condition the large increase in current ID when a short circuit condition exists. In that event, the sequence proceeds from element 98 to element 104 at which point a timer is started. Control circuit 46B then operates to sequentially double the ON resistance RT of the power path switch 44 as indicated by element 106. In order to first increase the ON resistance of switch 44 from 50 mΩ to 100 mΩ, the control circuitry turns the 2R segment 44A (FIG. 5) OFF so that the resistance is now 2R (100 mΩ) due to ON transistor segments 44B to 44F. A determination is then made to again determine if a short circuit condition is still present by comparing the discharge current ID to Imax as indicated by element 108. A short circuit condition continues to exist if the voltage measured across sense resistor 48 and the power path switch 44 indicates that, should switch 44 be turned back fully ON (50 mΩ), the current would exceed 2.5 A. For example, for a current sense resistance of 50 mΩ and a full ON resistance of 50 mΩ for the power path switch, the current will be limited to 2.5 A provided the voltage across the sum of resistor 48 and switch 44 does not exceed 250 mV (2.5 A×100 mΩ).

If the short circuit condition is no longer present, the sequence proceeds from element 108 of the flow chart to element 109 which indicates that a soft start of the power path switch is initiated. If the short circuit condition is still present, the sequence proceeds from element 108 of the flow chart to elements 100 and 102 and remains in the loop until the short circuit condition goes away (element 108). In the event the short circuit condition remains, the state of the timer is examined as indicated by element 110. If the condition is present for more than some predetermined amount of time, it is assumed that the short is continuous and control 46B turns the power path switch 44 OFF completely as indicated by block 112.

Assuming that the timer has not timed out, the sequence proceeds to determine whether only the last transistor segment 44F is still ON (element 1114), with that segment providing a resistance of 32R. If that is the case and if the short circuit condition persists then the final segment 44F is turned OFF so that switch 44 is fully OFF as shown by block 112. If more than a single transistor segment remains ON, the value of RT is again doubled (element 106) by turning the next segment 44B OFF which provides a resistance of 4R. Thus, when a 4R resistance is removed, RT is increased to 4R. The discharge current is again tested (element 108). Waveform 140 shows current ID where the resistance of switch 44 is doubled a first time as indicated by region 140A, with pulse 138A indicating that the short circuit condition continues to exist. Hence, another doubling of resistance as indicated by region 140B, followed by a pulse 138B indicates a continuing short circuit condition. A still further doubling (region 140C) of the resistance followed by a pulse 138B indicates the condition remains present. A fourth doubling in resistance is indicated by region 140D is sufficient in this example to reduce the current such that no further Comp 2 pulses are produced. This means that the short circuit condition has changed to the extent that it is now safe to begin turning switch 44 back on again. With the output Comp2 low for a duration equal to the delay provided by circuit 126, both inputs AND gate 128 will momentarily go high so as to produce a soft start pulse (SSP) 142A as shown in the FIG. 11 timing diagram. At this point, the segments of switch 44 will be sequentially turned ON as previously described in connection with FIG. 7A.

Returning to the FIG. 9 flow chart, this sequence is repeated, and assuming that the short circuit condition still remains and the timer has not timed out, RT is again doubled to 8R and then to 16R. As previously described, should RT reach 32R (element 114), the switch 44 is completely turned OFF by turning OFF the final 32R segment 44F (element 112). In order to minimize permanent damage, the sequence for total power path switch shut OFF, the goal of the present exemplary embodiment is to turn OFF the power path switch in less than 4 μsec. Thus, the maximum timer value used at element 110 of the sequence in this embodiment is set to 4 μsec. The sequential turn OFF period is preferably completed (all segments are fully OFF) in less than 50 μsec assuming that the short circuit condition persists that long.

Thus, various embodiments of a novel battery charging circuit including a power path switch have been described. Although these embodiments have been described in some detail, it is to be understood that various changes can be made by those skilled in the art without departing from the spirit and scope of the invention as defined by the appended claims.

What is claimed is:

1. A battery charger circuit comprising:
an input terminal; and
an output terminal;
a switch coupled between the input terminal and the output terminal, the switch including at least two transistor segments having common drain electrodes, common source electrodes and separate gate electrodes, the at least two transistor segments having different channel resistances;
current detection circuitry configured to detect a short circuit condition based on a detected current of the switch exceeding a predefined threshold current; and
a controller responsive to the detection of the short circuit condition, configured to successively turn off the at least two transistor segments until the detected current is below the predefined threshold current.

2. The battery charger circuit of claim 1 wherein the at least two transistor segments include at least four transistor segments having common drain electrodes, common source electrodes and separate gate electrodes.

3. The battery charger circuit of claim 1, wherein the controller responsive to the detection of the short circuit condition, is configured to successively turn off the at least two transistor segments until the detected current is below the predefined threshold current for a pre-defined period.

4. The battery charger circuit of claim 1, wherein the at least two transistor segments include at least four transistor segments having at least a first channel resistance, a second channel resistance greater than the first channel resistance, a third channel resistance greater than the second channel resistance, and a fourth channel resistance greater than the third channel resistance.

5. The battery charger circuit of claim 1, wherein the controller responsive to the detection of the short circuit condition, is configured to successively turn off the at least two transistor segments, in a sequence based on the channel resistances of the at least two transistor segments, until the detected current is below the predefined threshold current.

6. The battery charger of claim 1, wherein the at least two transistor segments include at least four transistor segments having at least a first channel resistance, a second channel resistance two times of the first channel resistance, a third channel resistance two times of the second channel resistance, and a fourth channel resistance two times of the third channel resistance.

7. A battery charging system, comprising:
a switching regulator;
a battery; and
a battery charge circuit including:
a switch coupled between the switching regulator and the battery, the switch including at least two transistor segments having common drain electrodes, common source electrodes and separate gate electrodes, the at least two transistor segments having different channel resistances;
current detection circuitry configured to detect a short circuit condition based on a detected current of the switch exceeding a predefined threshold current; and
a controller responsive to the detection of the short circuit condition, configured to successively turn off the at least two transistor segments until the detected current is below the predefined threshold current.

8. The system of claim 7 wherein the at least two transistor segments include at least four transistor segments having common drain electrodes, common source electrodes and separate gate electrodes.

9. The system of claim 7, wherein the at least two transistor segments include at least four transistor segments having at least a first channel resistance, a second channel resistance two times of the first channel resistance, a third channel resistance two times of the second channel resistance, and a fourth channel resistance two times of the third channel resistance.

10. The system of claim 7, wherein the at least two transistor segments include at least four transistor segments having at least a first channel resistance, a second channel resistance greater than the first channel resistance, a third channel resistance greater than the second channel resistance, and a fourth channel resistance greater than the third channel resistance.

11. The system of claim 7, wherein the at least two transistor segments include at least four transistor segments, with the transistor segments having at least a first channel resistance, a second channel resistance greater than the first channel resistance, a third channel resistance greater than the second channel resistance, and a fourth channel resistance greater than the third channel resistance.

12. The system of claim 7, wherein the controller responsive to the detection of the short circuit condition, is configured to successively turn off the at least two transistor segments, in a sequence based on the channel resistances of the at least two transistor segments, until the detected current is below the predefined threshold current.

* * * * *